United States Patent
Hiramatsu et al.

(10) Patent No.: US 6,835,000 B2
(45) Date of Patent: Dec. 28, 2004

(54) ULTRATHIN-WALLED ROLLING BEARING AND CAGE THEREFOR

(75) Inventors: Kengo Hiramatsu, Mie-ken (JP); Takeshi Tanimaru, Osaka-fu (JP)

(73) Assignees: NTN Corporation, Osaka-fu (JP); Nakanishi Metal Works Co., Ltd., Osaka-fu (JP)

(*) Notice: Subject to any disclaimer, the term of this patent is extended or adjusted under 35 U.S.C. 154(b) by 0 days.

(21) Appl. No.: 10/741,432

(22) Filed: Dec. 22, 2003

(65) Prior Publication Data

US 2004/0170349 A1 Sep. 2, 2004

(30) Foreign Application Priority Data

Jan. 15, 2003 (JP) .................................. 2003-007053

(51) Int. Cl.⁷ .............................................. F16C 33/38
(52) U.S. Cl. ........................................ 384/523; 277/547
(58) Field of Search ................................ 384/523, 573, 384/578; 277/547, 533

(56) References Cited

U.S. PATENT DOCUMENTS

2002/0006238 A1 * 1/2002 Kobayashi .................. 384/523

* cited by examiner

*Primary Examiner*—Lenard A. Footland
(74) *Attorney, Agent, or Firm*—Arent Fox

(57) ABSTRACT

It is intended to suppress rattling in the fitted state of segments to improve operating efficiency in bonding the segments together.

A cage composed of a plurality of arcuate segments, wherein a joining projection formed in the bonding section of one of adjacent segments is fitted in a joining recess formed in the bonding section of the other to thereby annularly bond the segments. In this cage, said joining projection and joining recess have tapered fitting surfaces as seen in a radial section, and the two fitting surfaces are closely contacted and joined together.

11 Claims, 11 Drawing Sheets

Fig. 10(a)
Fig. 10(b)
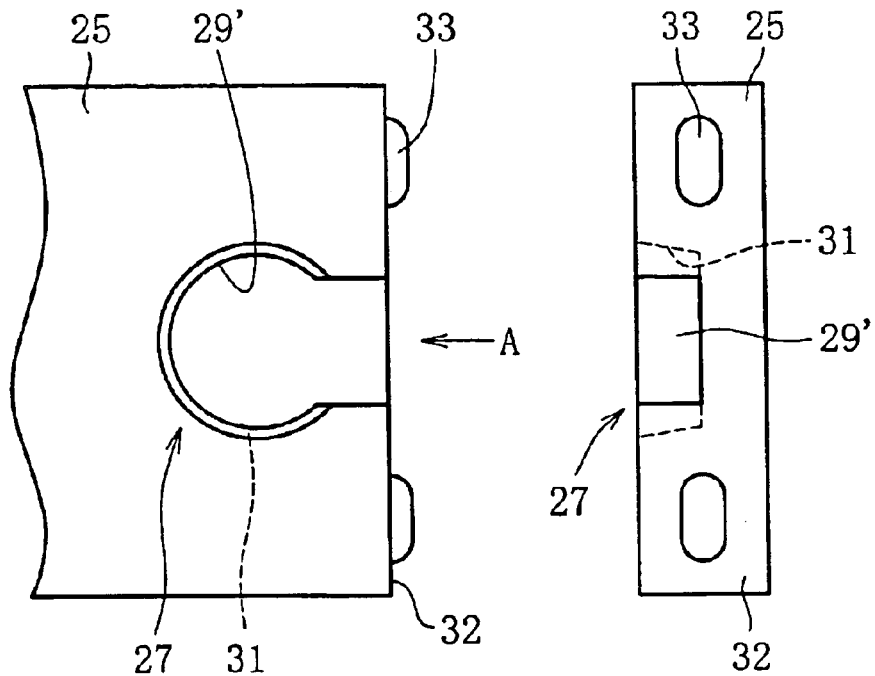
Fig. 11(a)
Fig. 11(b)
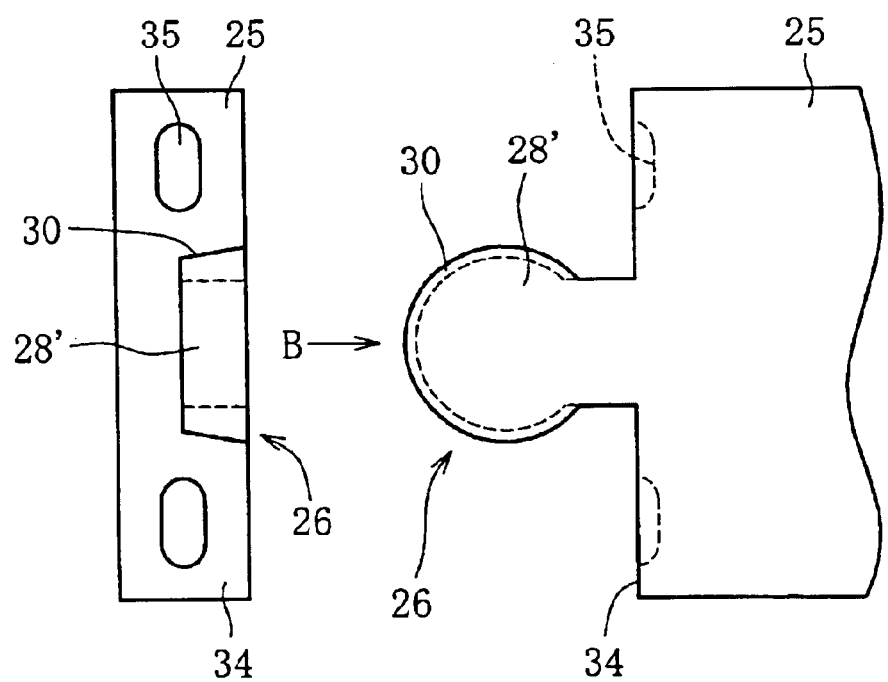

Fig. 17(a)
Fig. 17(b)
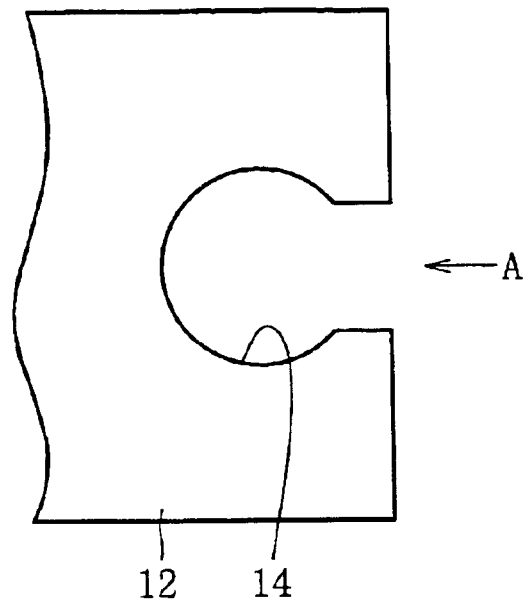
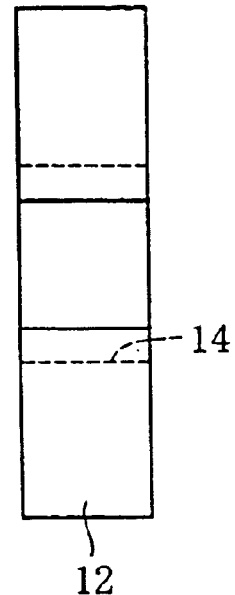
Fig. 18(a)
Fig. 18(b)
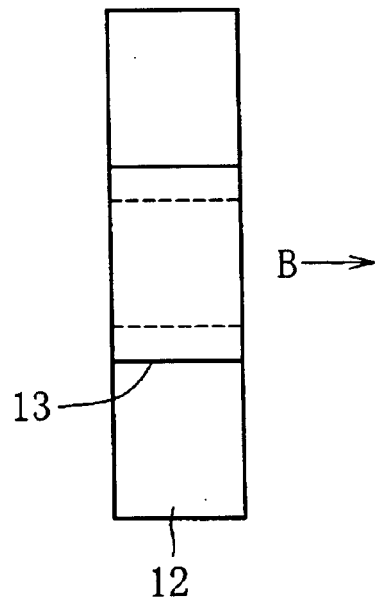
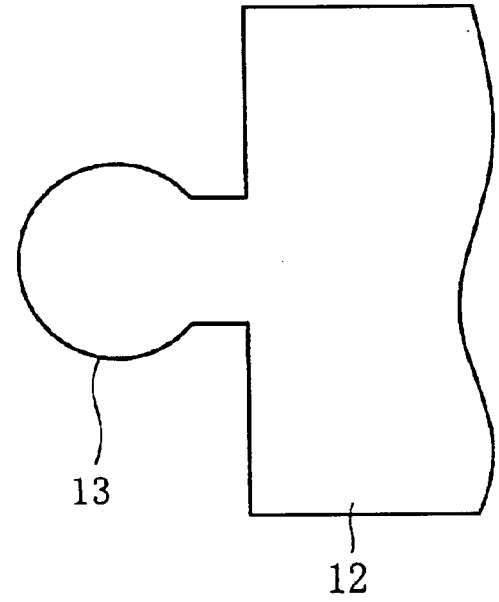

ULTRATHIN-WALLED ROLLING BEARING AND CAGE THEREFOR

BACKGROUND OF THE INVENTION

1. Field of the Invention

The present invention relates to an ultrathin-walled rolling bearing used, for example, in industrial robots, machine tools, medical instruments, and the like, and it also relates to a cage incorporated in such bearings.

2. Description of the Prior Art

FIG. 14 shows an example of a CT scanner device that is a kind of medical instrument. As shown in the same figure, in the CT scanner device, X-rays produced by an X-ray tube device 1 are radiated to a subject 4 through a wedge filter 2 for uniformizing their intensity distribution and a slit 3 for restricting said intensity distribution. The X-rays passing through the subject 4 are received by a detector 5, where they are converted into an electric signal, which is then fed to an unillustrated computer.

Such parts as the X-ray tube device 1, wedge filter 2, slit 3, and detector 5 in this CT scanner device are mounted on a substantially cylindrical rotary frame 8 rotatably supported on a fixed frame 7 through a bearing 6, the rotary driving of said rotary frame 8 rotating the parts around the subject 4. In the CT scanner device, the rotary motion of the mutually opposed X-ray tube device 1 and detector 5 around the subject 4 provides the projection data covering all angles in the examination cross-section of the subject 4, and a tomographic image is obtained from a reconstructed program programmed in advance from these data.

In the CT scanner device, since the inner periphery of the fixed frame 7 is formed with a large diameter (about 1 m) to receive the subject 4, a bearing that is very small in cross-sectional area for its diameter, or a so-called ultrathin-walled rolling bearing is used as the bearing 6 between the fixed and rotary frames 7 and 8.

In the prior art, for ultrathin-walled rolling bearings used in CT scanner devices, split type cages are frequently used. Such type of cage 11 is of split construction, as shown in FIGS. 15 and 17, having a plurality of arcuate segments 12 annularly formed by being circumferentially joined together. In the prior art, as shown in FIGS. 17(a) and (b) and 18(a) and (b), each segment 12 is formed at its opposite ends with projection-shaped or recess-shaped fitting sections 13 and 14, and such projection-shaped or recess-shaped fitting sections 13 and 14 are assembled, by fitting, to the recess-shaped or projection-shaped fitting sections 14 and 13 at the ends of the mating segment (see FIG. 19). That is, as shown in FIG. 20, one (for example, projection-shaped) fitting section 13 of the segment 12 is radially pushed into the recess-shaped fitting section 14 of the mating segment 12, whereby they are circumferentially engaged with each other to form a cage 11 (see, for example, Japanese Unexamined Patent Publications 2001-304266 (paragraph no. 0018, and FIGS. 2 and 3) and 2002-81442 (paragraph no. 0016, and FIGS. 3 and 4). Each segment 12 is formed with a pocket 15 for receiving a ball.

In this connection, in the prior art, a proper interference is imparted to the fitting sections 13 and 14 of the segments 12 constituting the cage 11 and the mating segments 12 are joined, thereby forming an annular cage 11. The segments 12 forming this cage 11 are generally injection moldings of resin, with the result that molding errors or the like causes the interference between the fitting sections to increase in some cases or decrease in other cases, sometimes resulting in rattling produced between the fitting sections 13 and 14.

If the interference between the fitting sections 13 and 14 of the segments 12 increases as described above, the two fitting sections 13 and 14 tend to easily interfere with each other when one fitting section 13 is radially pushed into the mating fitting section 14, so that smooth fitting of the two fitting sections 13 and 14 becomes difficult and the operating efficiency greatly lowers.

Reversely, if the interference between the fitting sections 13 and 14 of the segments 12 decreases to produce rattling, the cage 11 tends to easily change in shape from a right circle to a polygon, producing a radially inward or outward deviation between the adjacent segments 12, the deviated segment 12 coming into contact with the raceway surface of the inner or outer member, generating abnormal sounds such as hammering sounds or vibrating sounds, and causing a rise in bearing torque.

Particularly in the CT scanner device, abnormal sounds of this type are likely to induce a stress in the subject 4, making it strongly desired to lower the abnormal sound generating level Further, in the case where the rolling elements in the cage 11 are balls, a decrease in the clearance between the pocket 15 and the balls due to contraction deformation of the pocket 15 tends to restrain the balls in the pockets 15, resulting in an increase in the bearing torque.

SUMMARY OF THE INVENTION

The present invention has for its object the provision of a cage adapted to suppress rattling in fitted-together segments and to improve operating efficiency in joining segments, and an ultrathin-walled rolling bearing having such cage.

The invention provides a cage composed of a plurality of arcuate segments, wherein the joining projection formed in the bonding section of one of adjacent segments is fitted in a joining recess formed in the bonding section of the other segment to thereby annularly bond the segments, said cage being characterized in that said joining projections and joining recesses have a tapered fitting surface, for example, a conical surface, as seen in a radial section, and joining is effected by closely contacting the two fitting surfaces. In addition, the radial dimension of the jointing projections and joining recesses may be made smaller than the radial dimension of the segments. Here, the above-mentioned "radial" means radial with respect to a circle defined by the segments when annularly bonded together.

In the cage of the invention, fitting the bonding sections of the segments along the radially tapered fitting surfaces, for example, conical surfaces, allows a change in interference between the joining projections and recesses due to molding errors or the like to escape radially of the cage in the fitting surfaces, so that rattling in the fitted state can be suppressed to realize a stabilized fitted state. Therefore, the function of the cage can be maintained stabilized for a long time, and the generation of abnormal sounds due to contact between radially deviated segments and the raceway surfaces of the inner and outer members can be reliably prevented. Assembly of the cage can be easily effected, efficient assembly being possible. It is desired that the segments constituting the cage of the invention be made of resin, such as PPS (polyphenylene sulfide).

In the above arrangement, the butt surface of the bonding section of one of adjacent segments is formed with a projecting engaging section while the butt surface of the bonding section of the other segment is formed with a recessed engaging section, and the two butt surfaces butt against each other; thus radial positional deviation of the cage can be reliably prevented by controlling the radial position of the segments; this serves as a slip-off prevention means.

A cage which is a target of the invention is annularly formed by circumferentially bonding a plurality of segments, has pockets for receiving rolling elements at circumferentially equispaced intervals, and is suitable for use in an ultrathin-walled rolling bearing whose ratio of the diameter of said rolling elements to the pitch circle diameter of the bearing is not more than 0.03.

The cage of said arrangement is adapted to constitute an ultrathin-walled rolling bearing by combining an outer member having a raceway surface in its inner periphery, an inner member having a raceway surface in its outer-periphery, and a plurality of rolling elements interposed between the raceway surfaces of said outer and inner members, and in this ultrathin-walled rolling bearing, the cage having the rolling elements circumferentially equispaced therein is capable of reliably preventing the generation of abnormal sounds due to contact between the segments and the raceway surfaces of the inner and outer members.

If one of the outer and inner members in this ultrathin-walled rolling bearing is fixed in the rotary frame of a CT scanner device rotating around a subject and the other is fixed in the fixed frame of the CT scanner device, then it is possible to provide a CT scanner device which has low noise and is superior in radiographic accuracy.

BRIEF DESCRIPTION OF THE DRAWINGS

FIG. 10 shows a third embodiment of the invention, wherein (a) is a plan view of one segment formed with a shallow joining recess, and (b) is a view taken in the direction of arrow A in (a);

FIG. 11 shows the third embodiment of the invention, wherein (a) is a view taken in the direction of arrow B in (b), and (b) is a plan view of the other segment formed with a shallow joining projection;

FIG. 17 shows a conventional example of the cage of an ultrathin-walled rolling bearing, wherein (a) is a plan view of one segment formed with a recessed fitting section and (b) is a view taken in the direction of arrow A in (a);

FIG. 18 shows the conventional example of the cage of an ultrathin-walled rolling bearing, wherein (a) is a view taken in the direction of arrow B in (b) and (b) is a plan view of the other segment formed with a projecting fitting section;

DESCRIPTION OF THE PREFERRED EMBODIMENTS

Figure 5:
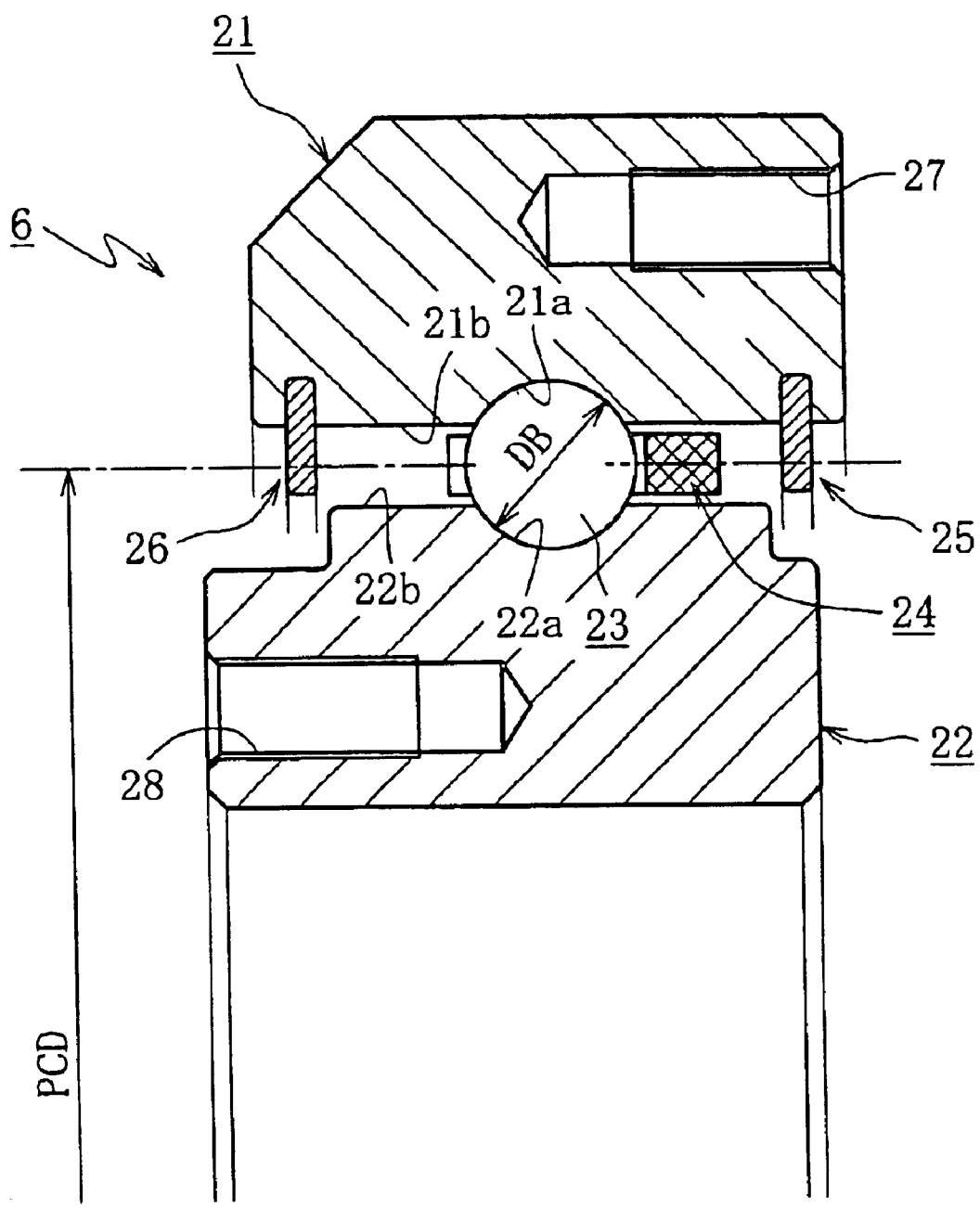
FIG. 5 is an axial sectional view, partly omitted, showing an ultrathin-walled rolling bearing to which the invention is applied.
Figure 6A:
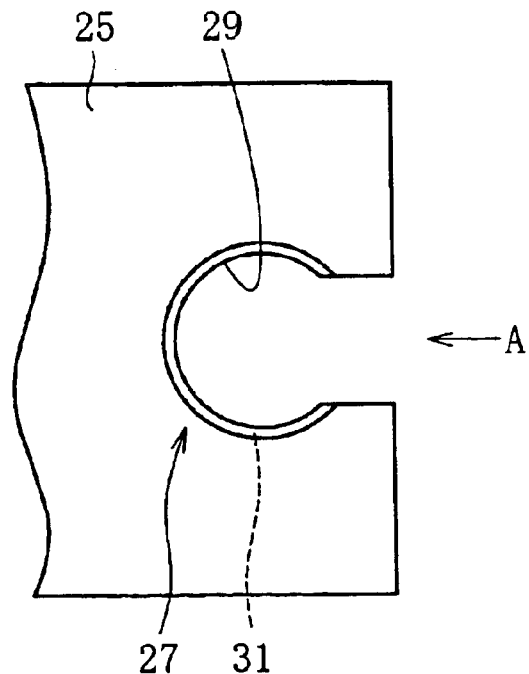
FIG. 6 shows a second embodiment of the invention, wherein (a) is a plan view showing one segment having an annular recessed engaging section formed in a joining recess, and (b) is a view taken in the direction of arrow A in (a)
Figure 6B:
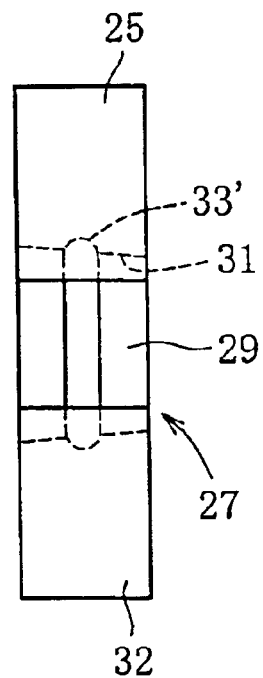
Figure 7A:
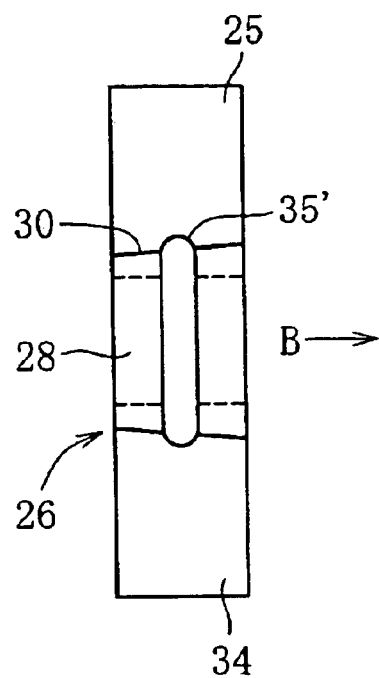
FIG. 7 shows the second embodiment of the invention, wherein (a) is a view taken in the direction of arrow B in (b), and (b) is a plan view showing the other segment having an annular projecting engaging section formed in a joining projection.
Figure 7B:
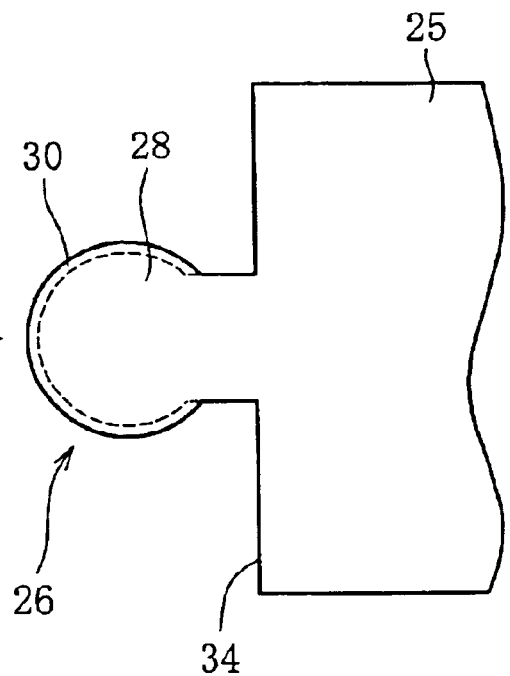
Figure 8:
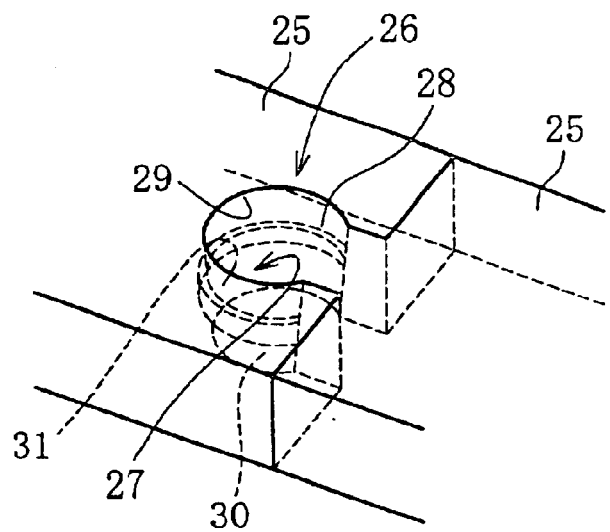
FIG. 8 showing the second embodiment of the invention is a partial enlarged perspective view showing the state after adjacent segments have been joined.
Figure 9:
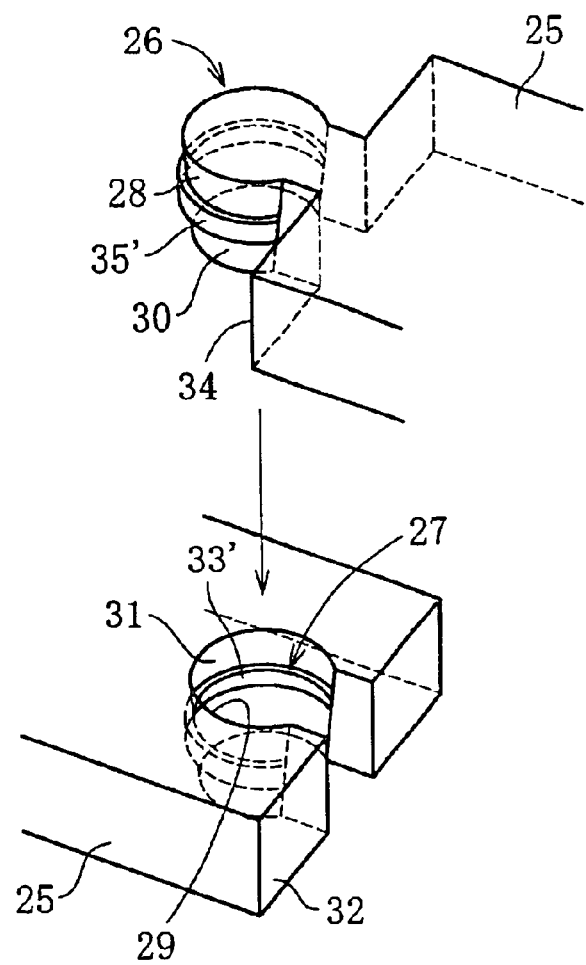
FIG. 9 showing the second embodiment of the invention is a partial enlarged perspective view showing the state before the adjacent segments are joined.
Figure 14:
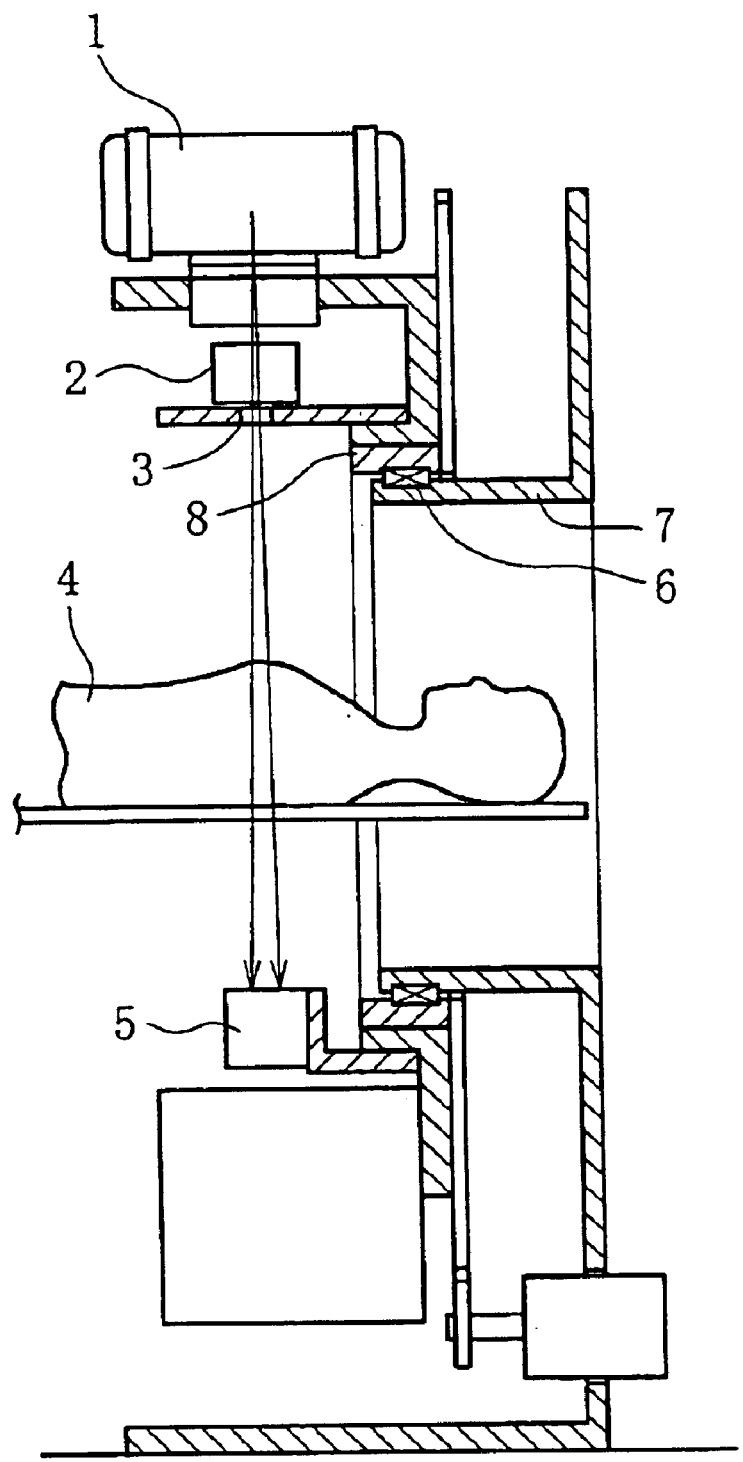
FIG. 14 is a sectional view showing a schematic arrangement of a CT scan device.

FIG. 5 shows a concrete constructional example of an ultrathin-walled rolling bearing 6 assembled to a CT scanner device shown in FIG. 14. This bearing 6, as shown in the same figure, comprises an annular outer ring 21, which is an outer member, an annular inner ring 22, which is an inner member, disposed concentrically on the inner peripheral side of the outer ring 21, a plurality of balls 23, which are rolling elements, interposed between the raceway surface 22a of the inner ring 22 and the raceway surface 21a of the outer ring 21, a cage 24 for holding the balls 23 at circumferentially equispaced intervals, and seals 25 and 26 for sealing the openings at the opposite ends of the bearing 6.

In addition, in this embodiment, the balls 23 are illustrated as the rolling elements, but rollers may be used. Further, the invention is not limited to a single row rolling bearing having a single row of rolling elements, and is applicable to a double row rolling bearing having two rows of rolling elements.

This bearing 6 is an ultrathin-walled rolling bearing in which the ratio $\phi$ of the diameter DB of the balls 23 to the pitch circle diameter PCD is not more than 0.03 ($\phi$=(DB/PCD) $\leq$0.03); for example, these factors are set such that the ball diameter is ½ inch (12.7 mm), the PCD is 1041.4 mm, and their ratio $\phi$ is 0.012. The bearing 6 is a large diameter bearing whose PCD is mainly 500 mm–1500 mm or so.

Attaching holes 27 are formed in an end surface on one end side (right-hand side in the figure) of the outer ring 21, and unillustrated fastening means, such as bolts, are screwed into the attaching holes 27, whereby the outer ring 21 is fixed to the rotary frame 8 of the CT scanner device shown in FIG. 14. Attaching holes 28 are likewise formed in an end surface on the other end side of the inner ring 22, and unillustrated fastening means, such as bolts, are screwed into the attaching holes 28, whereby the inner ring 22 is fixed to the fixed frame 7.

Thus, it is seen from the above that the outer ring 21 constitutes a rotary member which rotates with the rotary frame 8 and that the inner ring 22 constitutes a nonrotatable fixed member. Depending upon the construction of the CT scanner device, in a manner reverse to the above, the outer ring 21 may be made to be the nonrotatable fixed side and the inner ring 2 to be the rotary side rotating with the rotary frame 8.

Figure 15:
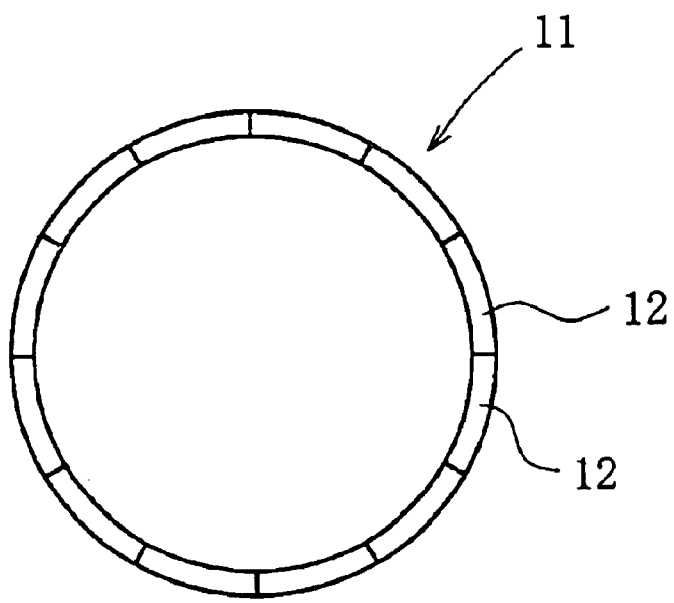
FIG. 15 is a front view showing a schematic arrangement of a cage used in an ultrathin-walled rolling bearing incorporated into the CT scan device.

The cage 24 is formed by injection-molding a resin material into a predetermined shape, which resin material is suitably PPS (polyphenylene sulfide) for example. This cage 24, as in the prior art, is a split type in which a plurality of arcuate segments 25 of resin are circumferentially connected together in annular form (see the segment 12 of a conventional cage 11 shown in FIG. 15).

Figure 16:
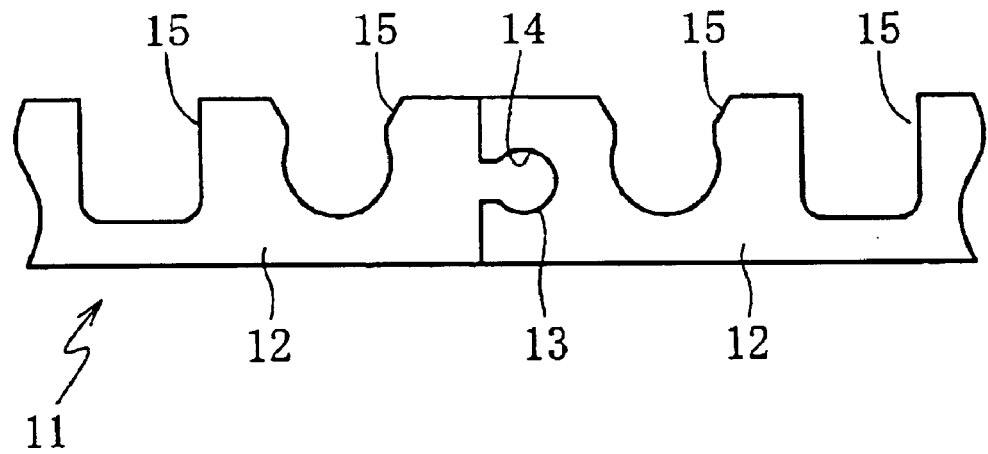
FIG. 16 is a developed plan view showing the bonding sections of segments constituting the cage.
Figure 19:
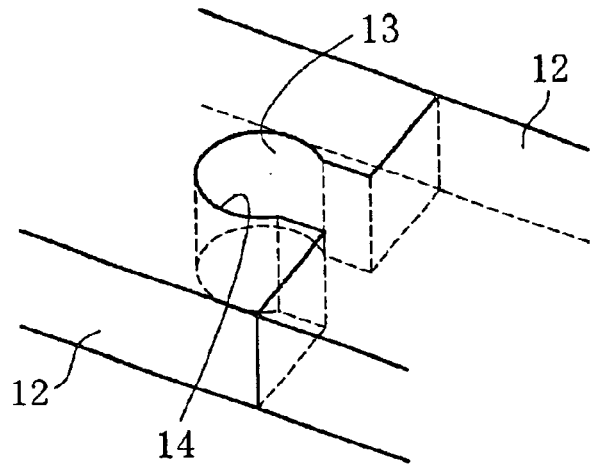
FIG. 19 showing the conventional example of the cage of an ultrathin-walled rolling bearing is a partial enlarged perspective view showing the state after adjacent segments have been joined.
Figure 20:
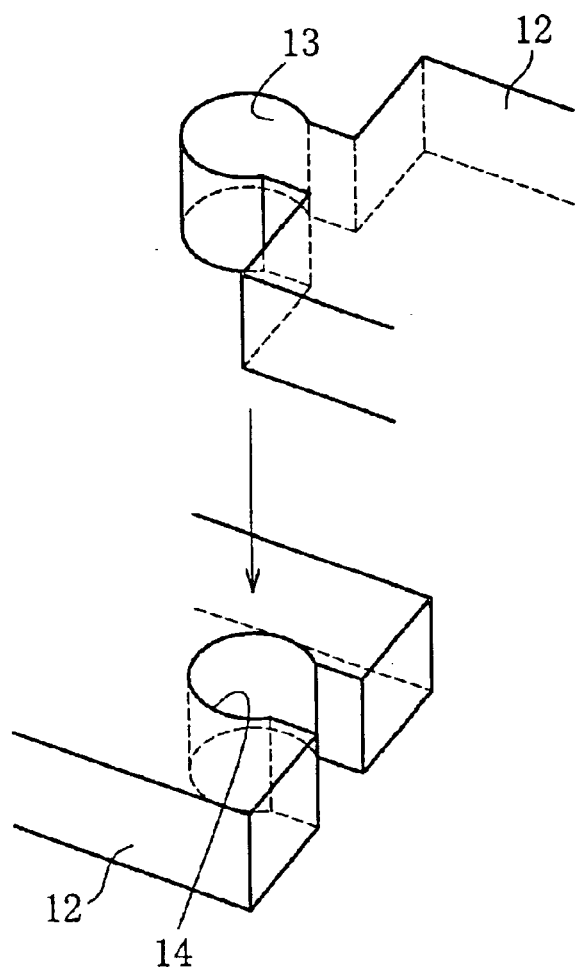
FIG. 20 showing the conventional example of the cage of an ultrathin-walled rolling bearing is a partial enlarged perspective view showing the state before adjacent segments are joined.

Each segment 25 has a plurality of pockets formed at circumferentially equispaced intervals for receiving the balls 23 (see the pockets 15 of the conventional segment 12 shown in FIG. 16). While open type pockets with one axial side opened are illustrated as the pockets, a window type pocket with the periphery closed, not shown, may be used.

Figure 1A:
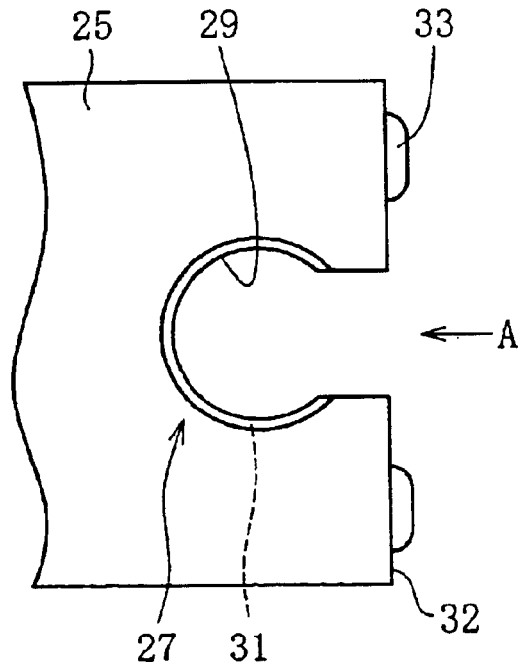
FIG. 1 shows a first embodiment of the invention, wherein (a) is a plan view of one segment formed with a joining recess, and (b) is a view taken in the direction of arrow A in (a)
Figure 1B:
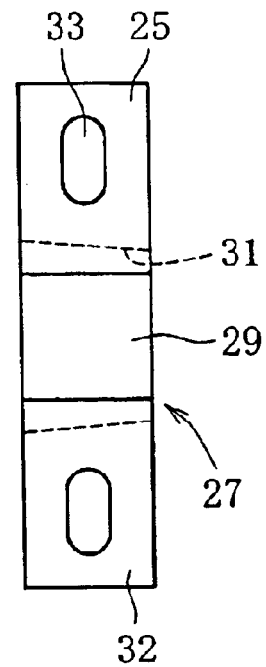
Figure 2A:
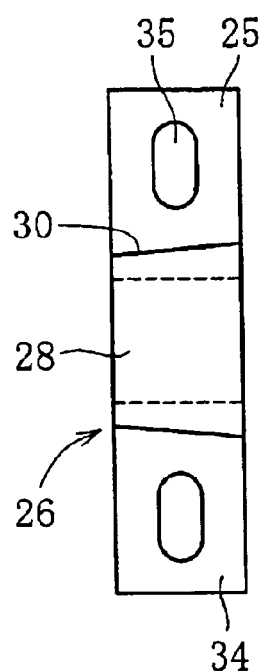
FIG. 2 shows the first embodiment of the invention, wherein (a) is a view taken in the direction of arrow B in (b), and (b) is a plan view showing the other segment formed with a joining projection.
Figure 2B:
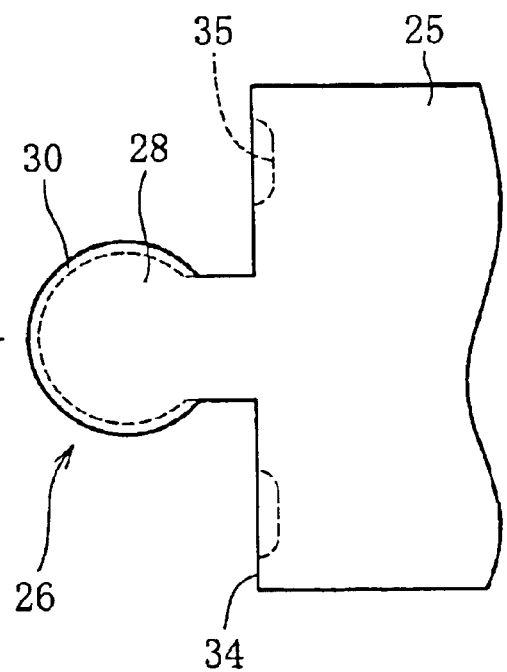
Figure 3:
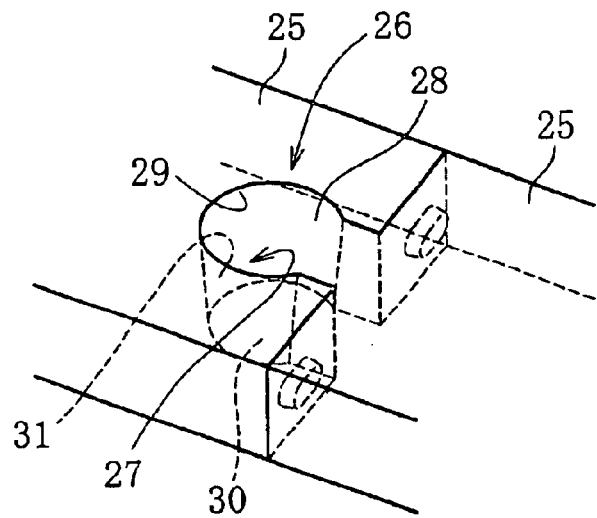
FIG. 3 showing the first embodiment of the invention is a partial enlarged perspective view showing the state after adjacent segments have been joined.
Figure 4:
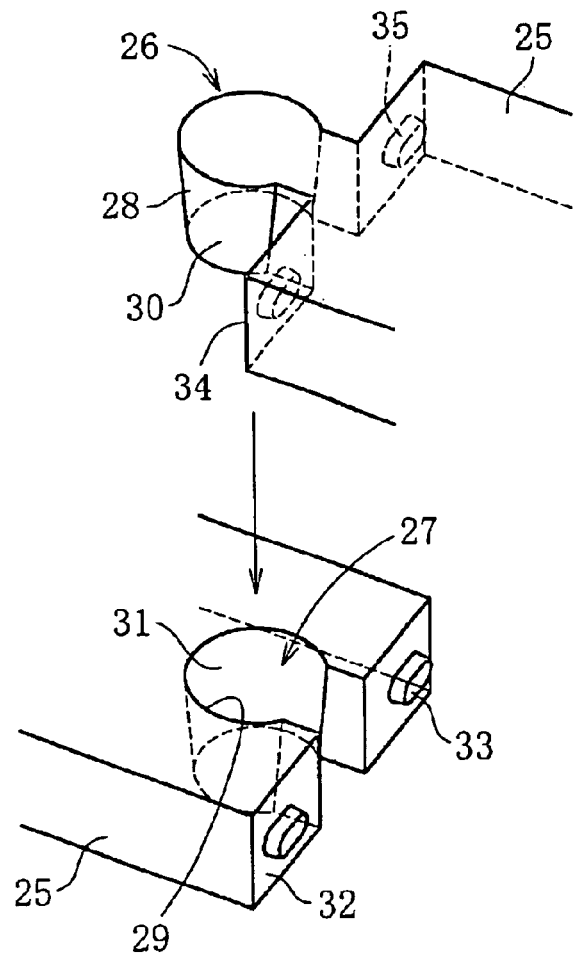
FIG. 4 showing the first embodiment of the invention is a partial enlarged perspective view showing the state before the adjacent segments are joined.

Each segment 25, as shown in FIGS. 1(a) and (b) and FIGS. 2(a) and (b), is formed at its opposite ends with bonding sections 26 and 27 for bonding with adjacent segments 25. In addition, FIG. 3 shows the assembly-completed state after the bonding sections 26 and 27 of adjacent segments 25 have been fitted together, and FIG. 4 shows the state before the bonding sections 26 and 27 of adjacent segments 25 are fitted together.

One bonding section 26 is formed with a joining projection 28 circumferentially extending from the end surface of the segment 25. This joining projection 28 is constricted in the proximal end and is composed of a neck on the proximal end side and a head axially extending therefrom on the front end side. It is only necessary for the head to have an axial width in a portion thereof greater than the axial width of the neck; for example, it is formed as a circle as seen in a plan view, as shown. In addition, it may be other than a circle or it may be a polygon.

The other bonding section 27 is formed with a joining recess 29 disposed backwardly of the end surface of the segment 25. This joining recess 29 is shaped to be suited to the joining projection 28 and is composed of a constricted section corresponding to the neck and an enlarged section corresponding to the head.

The outer peripheral surface of the head of the joining projection 28 is formed with a fitting surface 30 which is tapered as seen in a radial section, that is, it is a conical surface. The inner peripheral surface of the enlarged section of the joining recess 29 is formed with a fitting surface 31 which is tapered as seen in a radial section, that is, it is a conical surface. The smallest outer diameter of the joining projection 28 and the smallest inner diameter of the joining recess 29, and the largest outer diameter of the joining projection 28 and the largest inner diameter of the joining recess 29 are set at the same dimension, respectively.

In the above arrangement, the bonding between adjacent segments 25 is effected in the following procedure. First, the segments 25 are disposed in radially separated parallel relation as shown in FIG. 4, and from this state the joining projection 28 is radially pushed into the joining recess 29 (see FIG. 3). This results in close fitting between the conical fitting surface 30 of the joining projection 28 and the conical fitting surface 31 of the joining recess 29.

Fitting the conical fitting surfaces 30 and 31 together in this manner makes it possible for a change in interference between the joining projection 28 and the joining recess 29 due to molding errors or the like to radially escape at the fitting surfaces 30 and 31, so that rattling in the fitted state can be suppressed to realize a stabilized fitted state. In addition, in the embodiment described above, the joining projection 28 formed in one of the adjacent segments 25 has substantially the same radial dimension (thickness) as the radial dimension (thickness) of the segment 25. Further, the joining recess 29 formed in the other has substantially the same radial dimension (depth) as the radial dimension (thickness) of the segment 25.

Further, projecting engaging sections 33 are formed on the butt surface 32 of the bonding section 26 in one of the adjacent segments 25, while recessed engaging sections 35 are formed in the butt surface 34 of the bonding section 27 of the other, and the two butt surfaces 32 and 34 butt against each other. The provision of the bonding sections 26 and 27 of the segments 25 with the engaging sections 33 and 35 adapted to have a mutual recess-projection engagement at the butt surfaces 32 and 34 of the mating segments 25 serves as a slip-off prevention means for preventing radially inward or outward deviation between the adjacent segments 25.

In the first embodiment described so far, the butt surfaces of the bonding sections are formed with recessed and projecting engaging sections, respectively; however, as in the second embodiment shown in FIGS. 6 through 9, the fitting surface 31 of the bonding section 26 of one of the adjacent segments 25 may be formed with a projecting engaging section 33', while forming the fitting surface 30 of the bonding section 27 of the other with a recessed engaging section 35'.

Thereby, in fitting the bonding sections 26 and 27 of the segments 25 together at the fitting surfaces 31 and 30, the engaging sections 33 and 35 formed in the fitting surfaces 31 and 30 are brought into a recess-projection engagement, thereby serving as a slip-off prevention means for preventing radially inward or outward deviation between the adjacent segments 25.

In addition, besides forming annular engaging sections 33' and 35' continuous peripherally of the fitting surfaces 31 and 30 as in the second embodiment, they may be engaging sections of noncontinuous shape formed peripherally of the fitting surfaces.

Figure 12:
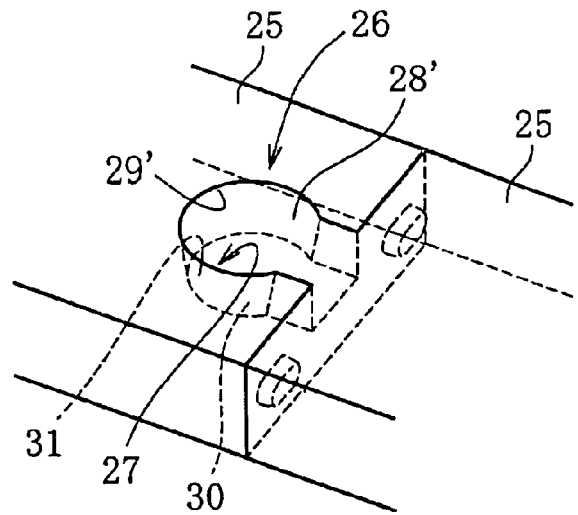
FIG. 12 showing the third embodiment of the invention is a partial enlarged perspective view showing the state after adjacent segments have been joined.
Figure 13:
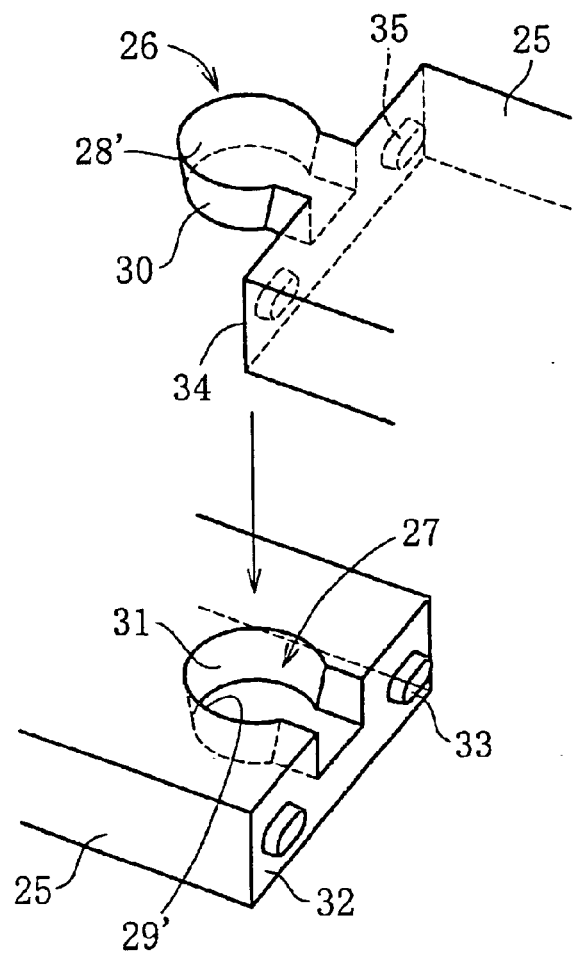
FIG. 13 showing the third embodiment of the invention is a partial enlarged perspective view showing the state before adjacent segments are joined.

In the first and second embodiments, a description has been given of a case where the joining projection 28 and joining recess 29 have the same thickness as that of the segments 25; however, the invention is not limited thereto; the invention may be in the form of a third embodiment having a construction shown in FIGS. 10(a) and (b), FIGS. 11(a) and (b), and FIGS. 12 and 13.

The third embodiment differs from the first and second embodiments described above only in the thickness of the joining projection 28' and joining recess 29' formed in the bonding sections 26 and 27 of the segments 25. Therefore, since other arrangement, function and effect are the same as in the first and second embodiments, a description thereof is omitted. In a cage according to the third embodiment, the thickness of the joining projection 28' and the depth of the joining recess 29' of the segments 25 are reduced to about ½ of the thickness of the segments 25.

What is claimed is:

1. A cage composed of a plurality of arcuate segments, wherein the joining projection formed in the bonding section of one of adjacent segments is fitted in a joining recess formed in the bonding section of the other segment to thereby annularly bond the segments, said cage being characterized in that said joining projections and joining recesses have a tapered fitting surface as seen in a radial section, and joining is effected by closely contacting the two fitting surfaces.

2. A cage as set forth in claim 1, characterized in that the fitting surface of the bonding section of one of adjacent segments is formed with a projecting engaging section, while the fitting surface of the bonding section of the other is formed with a recessed engaging section.

3. A cage as set forth in claim 1, characterized in that the butt surface of the bonding section of one of adjacent segments is formed with a projecting engaging section, while the butt surface of the bonding section of the other is formed with a recessed engaging section, and the two butt surfaces butt against each other.

4. A cage as set forth in any one of claims 1 through 3, characterized in that said segments are made of resin.

5. A cage as set forth in claim 1 or 2, characterized in that said fitting surfaces are conical surfaces.

6. A cage as set forth in claim 1, characterized in that the radial dimension of said joining projection and joining recess is smaller than the radial dimension of the segments.

7. A rolling bearing, characterized in that a cage as set forth in claim 1, is incorporated in the bearing.

8. A rolling bearing as set forth in claim 7, characterized the ratio of the diameter of said rolling elements to the pitch circle diameter of the bearing is not more than 0.03.

9. A rolling bearing as set forth in claim 8, characterized by comprising an outer member having a raceway surface in its inner periphery, an inner having a raceway surface in its outer periphery, a plurality of rolling elements interposed between the raceway surfaces of said outer and inner members, and a cage having the rolling elements circumferentially equispaced therein.

10. A rolling bearing as set forth in claim 7, characterized by comprising an outer member having a raceway surface in its inner periphery, an inner member having a raceway surface in its outer periphery, a plurality of rolling elements interposed between the raceway surfaces of said outer and inner members, and a cage having the rolling elements circumferentially equispaced therein.

11. A rolling bearing as set forth in claim 10 or 9, characterized in that one of the outer and inner members is fixed in the rotary frame of a CT scanner device rotating around a subject and the other is fixed in the fixed frame of the CT scanner device.

* * * * *